United States Patent Office 3,161,577
Patented Dec. 15, 1964

3,161,577
PROCESS FOR PREPARING β,β-DICHLORO-
PROPIONITRILE
Michael J. D'Errico, Stamford, Conn., assignor to American Cyanamid Company, New York, N.Y., a corporation of Maine
No Drawing. Filed Oct. 4, 1961, Ser. No. 142,790
3 Claims. (Cl. 204—158)

This invention relates to the production of β,β-dichloropropionitrile. More particularly, it relates to a novel method for the preparation of this compound which may be represented by the following structural formula:

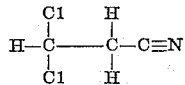

β,β-Dichloropropionitrile has been previously described in the literature. For example, British Patent 571,750 discloses the compound together with a number of other halogenated propionitriles which are useful as intermediates for the preparation of unsaturated nitriles and polymers derived therefrom. However, the British patent is silent as to a method for obtaining β,β-dichloropropionitrile.

Halogenated derivatives of acrylonitrile which are useful in the preparation of polymers and as intermediates for the preparation of other chemical compounds have previously been obtained by a number of different routes. Since the double bond in acrylonitrile is activated, it readily undergoes such reactions as hydrogenation and alcoholysis as well as halogenation. Halogenation of acrylonitrile has been used to prepare monohalo-, dihalo- and trihalo- propionitriles. For example, in a nonaqueous medium, the direct chlorination of acryloniarile yields α,α,β - trichloropropionitrile, α,β,β - trichloropropionitrile and β-chloropropionitrile. In an aqueous medium, the direct chlorination of acrylonitrile produces α,β-dichloropropionitrile as well as substantial quantities of α-dichloro-β-hydroxy propionitrile. α,β-Dichloropropionitrile may also be obtained by a catalytic reaction of chlorine with acrylonitrile in a pyridine solution. Another method for the preparation of α,β-dichloropropionitrile involves the direct chlorination of acrylonitrile in the presence of light and in the absence of substantial amounts of oxygen and water. In all of these preparative methods, however, the reaction of chlorine with acrylonitrile takes place by addition to the double bond of the acrylonitrile molecule.

It has now been discovered that β,β-dichloropropionitrile may be obtained in good yield by the reaction of β-chloropropionitrile with chlorine in the presence of a free radical initiator. This method for obtaining β,β-dichloropropionitrile appears to involve the substitution of a chlorine atom for a hydrogen atom in the starting material, β-chloropropionitrile. Such substitution by a chlorine atom is totally unexpected and surprising in view of the fact that previously known reactions of halogen with acrylonitrile have all proceeded by means of addition reactions in all of which ionic reaction mechanisms may be found as the basis. Contrary-wise, in the process of this invention, the chlorination of β-chloropropionitrile is believed to proceed by means of a free radical reaction mechanism. While there is no intent herein to be bound by a particular theory or explanation of the exact mechanism involved, it is believed that the overall reaction proceeds as follows:

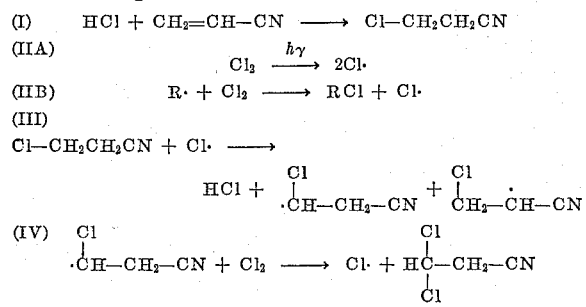

From the above depicted reaction scheme, it will be noted that the formation of β,β-dichloropropionitrile involves first the formation of β-chloropropionitrile from acrylonitrile and anhydrous hydrogen chloride in a known manner. Chlorine, under the influence of a free radical initiator e.g. light, which is indicated as $h\gamma$ or chemical catalysis, which is indicated as R· is then converted to a free radical of chlorine. The free radical of chlorine then reacts with β-chloropropionitrile to yield hydrogen chloride and two additional free radicals. The β-chloropropionitrile free radical from which the β-hydrogen was abstracted then combines with chlorine to yield the desired compound, β,β-dichloropropionitrile and another free radical of chlorine. The remaining β-chloropropionitrile free radical from which the α-hydrogen was abstracted is usually converted to α,α,β-trichloropropionitrile which is readily separated from the reaction mixture.

The reaction is conducted very simply by adding chlorine to a quantity of β-chloropropionitrile until the theoretical amount has been added or until no more chlorine is absorbed in the presence of visible light or in the presence of a free radical catalyst.

While a solvent is ordinarily not required, one may be employed providing the same is inert to the reactants. Typical and suitable solvents which may be employed in the process are carbon tetrachloride, benzene, chlorobenzene and the like and mixtures thereof. If the process is carried out in the presence of a solvent, anhydrous, oxygen-free chlorine is led directly from a supply source containing the compressed liquid into a mechanically stirred mixture of β-chloropropionitrile and solvent which is illuminated with visible light or which contains therein a catalyst for the reaction. Alternatively, the required amount of chlorine may be condensed in a trap and then while slowly evaporating the gas is swept by nitrogen into the reaction flask containing β-chloropropiontrile. The rate of flow of chlorine gas is not critical, but the preferred method for introducing the gas is at approximately the rate at which it is absorbed. At least one mole of chlorine for each mole of β-chloropropionitrile is introduced. However, an amount up to about a 50% excess of chlorine may be employed without causing troublesome side reactions.

If the process is operated in the absence of a solvent, anhydrous, oxygen-free chlorine is led into the flask containing β-chloropropionitrile at about the same rate as in the procedure used wherein a solvent was employed. After the required amount of chlorine has been added, the flow is stopped and the reaction mixture is allowed to stand until the reaction is substantially complete.

Thereafter, the mixture is transferred to equipment suitable for distillation. If a solvent has been used, the mixture is distilled at normal atmospheric pressure until the solvent and any unreacted β-chloropropionitrile are removed. Thereafter, vacuum is applied and the distillation is completed at a reduced pressure. The fraction boiling at 84–89° C. at 25 mm. is retained and analyzed. If no solvent has been used during the reaction, the distillation at normal atmospheric pressure may be eliminated and reduced pressure applied at the outset.

The temperature at which the reaction is conducted may be varied over a wide range. In the absence of a solvent, the reaction may be carried out at temperatures up to 100° C. In the presence of a solvent, the reaction temperatures may be as high as the boiling point of the solvent. However, temperatures within the range of about 70–90° C. are preferred because the reaction appears to proceed quite readily within this temperature range and yet is easily controllable. Inasmuch as the reaction is slightly exothermic, it may be desirable to employ cooling means in order to avoid a rise in temperature. Somewhat better yields may be obtained at temperatures as low as 0° C. but such low temperatures are not easily maintained.

Although it is preferred to carry out the reaction at atmospheric pressure, higher pressures may also be used with no evident undesirable side reactions.

If the reaction is catalyzed by light, then either visible light, ultraviolet light or X-rays may be employed and the length of the time of exposure of the reaction mixture will be dependent upon the rate at which chlorine is added. If the reaction is catalyzed by chemical free radical generating initiators, an amount of about .01% to 2% based upon the amount of β-chloropropionitrile is employed. The catalyst is generally added in equal portions over the time of the reaction. Typical free radical catalysts which may be employed with good success are azoisobutyronitrile, benzoyl peroxide, dicumyl peroxide, t-butylhydroperoxide and the like.

Whether light or chemical catalysis is used the time of reaction is dependent, of course, upon the rapidity of the decomposition of chlorine to its free radicals. In most instances, reaction times of from about ten minutes to several hours may be employed.

Since hydrogen chloride is produced during the course of the reaction, it may be recycled in order to obtain additional quantities of β-chloropropionitrile from acrylonitrile. In this manner, substantial economies in the over-all process may be realized.

β,β-Dichloropropionitrile may be readily converted to an extremely versatile intermediate, β-chloroacrylonitrile, by treatment with an inorganic or organic base. If desired, β,β-dichloropropionitrile need not be isolated from the β-chloropropionitrile-chlorine reaction mixture but instead may be treated directly with base in the reaction vessel prior to purification. Typical inorganic bases suitable for use in the conversion of β,β-dichloropropionitrile to β-chloroacrylonitrile include alkali metal hydroxides, e.g., sodium hydroxide, potassium hydroxide and the like; alkali metal phosphates, e.g., trisodium phosphate, disodium hydrogen phosphate and the like. Suitable organic bases are illustrated by amines, e.g., trimethylamine, pyridine and the like. In general, amounts of from about equimolecular quantities of base are required to convert β,β-dichloropropionitrile to the desired β-chloroacrylonitrile although a slight excess of base, e.g., up to about ten percent of the stoichiometric quantity, can also be used.

In order to illustrate the present invention, the following examples in which all parts are by weight unless otherwise indicated are given.

EXAMPLE I

Catalysis by Light (A) Into a suitable reaction vessel equipped with reflux condenser, stirrer and chlorine inlet tube is placed 300 parts of β-chloropropionitrile. The mixture is slowly stirred and chlorine is passed at a rate of one mole per hour to the inlet tube which extends to a point near the bottom of the flask. The flask is illuminated by means of a 200 watt lamp. The temperature of the reaction is maintained at 70–80° C. for a period of six hours. At the end of this time, the excess chlorine is allowed to evaporate and the remainder (385 parts) is fractionally distilled. The desired fraction, β,β-dichloropropionitrile is distilled at 85–93° C./25 mm. The yield is 230 parts or 55%.

(B) One mole (71 parts) of chlorine is swept by nitrogen (prepurified) into a flask containing one mole (89 parts) of β-chloropropionitrile. The amount of chlorine admitted into the flask is measured by condensing 71 parts of the gas into a trap and then slowly evaporating it. The flask is immersed in a bath maintained at 60–100° C. during the addition and is illuminated by an ultraviolet lamp.

After the addition which takes place over a period of two hours, the reaction mixture is fractionated to obtain β,β-dichloropropionitrile in a 40% yield, B.P., 84–89° C./25 mm. and $n_D^{25}$ 1.4657.

EXAMPLE 2

Chemical Catalysis

The procedure of Example 1B is repeated except that the flask is not illuminated. During the reaction, 1.6 parts of azoisobutyronitrile are added in equal portions over the time of the reaction. The temperature of the reaction mixture is maintained at 80° C. and the reaction is conducted for a period of two hours. Subsequently, the reaction mixture is worked up as in Example 1B to obtain a 30% yield of β,β-dichloropropionitrile, B.P., 84–89° C./25 mm.

EXAMPLE 3

Preparation of β-Chloroacrylonitrile From β,β-Dichloropropionitrile

Chlorine is added to 300 parts of β-chloropropionitrile for a period of six hours during which time the temperature of the reaction mixture is kept at 75–80° C. The reaction mixture is illuminated by a 200 watt incandescent lamp during this period. The crude material, amounting to 414 parts, is then heated with 800 parts of $$Na_2HPO_4 \cdot 12H_2O$$

and 310 parts of water with stirring for three hours at 78° C. The mixture is then cooled and extracted with ether. The ether solution is dried and the ether removed by vacuum distillation. The remaining oil is fractionated to obtain an over-all yield of 41% of pure β-chloroacrylonitrile.

I claim:

1. A process for preparing β,β-dichloropropionitrile which comprises reacting β-chloropropionitrile at a temperature of from about 0° C. to about 100° C., with chlorine in the presence of a free radical initiator and recovering the resultant product.

2. A process as in claim 1 in which the free radical initiator is light.

3. A process as in claim 1 in which the free radical initiator is chemical.

References Cited in the file of this patent
UNITED STATES PATENTS

| | | |
|---|---|---|
| 2,231,828 | Lichty | Feb. 11, 1941 |
| 2,390,470 | Sumner | Dec. 4, 1945 |
| 2,444,478 | Teter et al. | July 6, 1948 |

UNITED STATES PATENT OFFICE
CERTIFICATE OF CORRECTION

Patent No. 3,161,577                     December 15, 1964

Michael J. D'Errico

It is hereby certified that error appears in the above numbered patent requiring correction and that the said Letters Patent should read as corrected below.

Column 1, line 36, for "acryloniarile" read -- acrylonitrile --; line 40, for "α-dichloro-" read -- α-chloro- --.

Signed and sealed this 20th day of April 1965.

(SEAL)
Attest:

ERNEST W. SWIDER                     EDWARD J. BRENNER
Attesting Officer                      Commissioner of Patents